United States Patent
Lindh et al.

(10) Patent No.: US 7,888,837 B2
(45) Date of Patent: Feb. 15, 2011

(54) ROTOR FOR A GENERATOR

(75) Inventors: John Lindh, Jarfalla (SE); Andrew John Holmes, Baden (CH); Benjamin Gugerli, Niederlenz (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/651,230

(22) Filed: Dec. 31, 2009

(65) Prior Publication Data

US 2010/0181849 A1    Jul. 22, 2010

Related U.S. Application Data

(63) Continuation of application No. PCT/EP2008/057990, filed on Jun. 24, 2008.

(30) Foreign Application Priority Data

Jul. 2, 2007    (CH)  ..................... 1057/07

(51) Int. Cl.
  *H02K 3/48* (2006.01)
  *H02K 3/24* (2006.01)
(52) U.S. Cl. .................. 310/214; 310/215; 310/52; 310/59; 310/54
(58) Field of Classification Search .......... 310/52, 310/54, 59, 61, 214, 215; *H02K 3/24, 3/48*
See application file for complete search history.

(56) References Cited

U.S. PATENT DOCUMENTS

| | | | |
|---|---|---|---|
| 4,338,537 A | * | 7/1982 | Eckert et al. ............... 310/214 |
| 4,859,891 A | | 8/1989 | Jenkins et al. |
| 4,994,700 A | * | 2/1991 | Bansal et al. ............... 310/215 |
| 5,329,197 A | * | 7/1994 | Kudlacik .................... 310/198 |
| 5,477,095 A | * | 12/1995 | Kleinburger et al. ........ 310/215 |

(Continued)

FOREIGN PATENT DOCUMENTS

EP    0 336 042 A2    10/1989

(Continued)

OTHER PUBLICATIONS

International Search Report of Application No. PCT/EP2008/057990 dated Dec. 15, 2008.

(Continued)

*Primary Examiner*—Quyen Leung
*Assistant Examiner*—Terrance Kenerly
(74) *Attorney, Agent, or Firm*—Buchanan Ingersoll & Rooney PC

(57) ABSTRACT

A rotor for a generator includes a cylindrical rotor body with axial winding slots which are arranged in a distributed manner over the circumference and in which are arranged conductor elements which extend in the axial direction. A cooling medium from a sub-slot which is arranged at the bottom of the winding slot is fed along the axis in periodic intervals to the conductor elements. Beneath the conductor elements provision is made for ripple springs which in each case press the conductor elements of a winding slot against a slot wedge which closes off the winding slot at the top. With such a rotor, an adequate spring force is achieved by the ripple springs being arranged at the bottom of the sub-slot and, via an axial profile which is arranged in the sub-slot, acting by their spring force upon the conductor elements which lie above them.

20 Claims, 3 Drawing Sheets

U.S. PATENT DOCUMENTS

| | | | | |
|---|---|---|---|---|
| 5,854,525 | A | * | 12/1998 | Pommelet .................... 310/214 |
| 6,265,805 | B1 | * | 7/2001 | Debleser ............. 310/216.066 |
| 6,459,180 | B1 | * | 10/2002 | Mori et al. .................... 310/61 |
| 7,737,586 | B2 | * | 6/2010 | Tounosu et al. ............... 310/61 |
| 2002/0185923 | A1 | * | 12/2002 | Mori et al. .................... 310/61 |
| 2006/0163954 | A1 | | 7/2006 | Biais |

FOREIGN PATENT DOCUMENTS

| | | |
|---|---|---|
| EP | 0 652 623 A1 | 5/1995 |
| EP | 1 455 433 A1 | 9/2004 |
| FR | 2 857 521 A1 | 1/2005 |
| JP | 53-008708 A | 1/1978 |

OTHER PUBLICATIONS

International Search Report issued by the Swiss Patent Office on Dec. 11, 2007 as the International Searching Authority in Swiss Application No. 1057/2007 (with English translation of category of cited documents).

* cited by examiner

ROTOR FOR A GENERATOR

TECHNICAL FIELD

The present invention refers to the field of rotating machines. It refers to a rotor for a generator according to the preamble of claim 1.

PRIOR ART

A rotor for a turbogenerator is known from EP-A1-0 652 623, in which the conductor elements which are arranged in the winding slots are formed as hollow conductors and are cooled by means of a gaseous cooling medium which flows through the internal ducts of the conductor elements. In the bottom of the winding slot a sub-slot is let in through which the cooling medium is supplied and from there is fed radially upwards into the cooling ducts of the individual conductor elements. Beneath the stack of conductor elements, ripple springs are arranged which press the stack of conductor elements downwards against the slot wedge which closes off the winding slot at the top.

In EP-A1-1 455 433, a similarly constructed rotor of a turbogenerator is described, the conductor elements of which have in each case two parallel, axial cooling ducts which are divided into duct sections which are arranged in an alternating manner, overlap each other, and are separated from each other flow-wise. The duct sections at one end are exposed to admission of a cooling medium which is fed through a sub-slot and, after flowing through the duct section, is discharged radially outwards in each case. Such a cooling concept, which is referred to as "forward flow", is characterized in that the cooling medium is fed into the two cooling ducts of the conductor elements in an alternating manner at individual points.

It is desirable, even in the case of the described "forward-flow" cooling, that ripple springs, which press the winding radially outwards and ensure that the winding (i.e. the contents of the winding slot) is compressed in all operating states, are inserted in the winding slots beneath the conductor elements. The use of springs in this case particularly has the following advantages:

Rather large deviations in the geometric dimensions (height) of the components in the winding slot (conductor elements, insulations, etc,) can be tolerated.

There is no necessity to adjust the thickness of all upper packings, as a result of which costs and time are saved.

All the upper conductor elements lie to a greater or lesser extent on the same radius. Consequently, a steady transition from the upper packing to the insulation of the end winding results.

The compression of the winding-slot contents ensures that there is only slightly relative movement, or no relative movement at all, between the individual windings and so the risk of short circuits between the windings or earth faults is lessened.

The use of springs which are located under the conductor elements in the case of "forward-flow" cooling, however, runs into difficulties. On account of the large weight of the conductor elements, the spring force of the springs must be very large. This, however, is not possible if the springs are arranged directly beneath the stack of conductor elements because only short spring sections can be inserted between adjacent inlet openings for the cooling medium from the sub-slot into the cooling ducts, and so that the total overall length of all the spring sections constitutes only a fraction of the overall length of the winding slot. This relationship is worsened even further because in addition a certain creepage path of the springs has to be ensured so that the effective axial spring length is less than 50% of the overall slot length.

Furthermore, it is disadvantageous that a large number of individual springs have to be provided and installed per winding slot, which leads to more than 100 spring elements per rotor.

It would indeed be conceivable to increase the spring force by increasing the material thickness. However, the springs which are currently used with their thickness at the calculated load already lie close to the elasticity limit, and an increase of the material thickness would further increase the load.

These problems exist not only in the case of a "forward-flow" cooling but also in the case of rotors with radial cooling in which a cooling medium is delivered along the axis in periodic intervals into radial cooling ducts through the winding, which cooling medium is fed through an axial sub-slot which is let into the bottom of the winding slot.

SUMMARY OF THE INVENTION

It is the object of the invention to create a rotor which on the one hand is equipped with cooling which feeds the cooling medium through a sub-slot and feeds it in periodic intervals from the sub-slot into the winding, and on the other hand utilizes the advantages of contents of the winding slot being pretensioned by means of springs.

The object is achieved by means of the entirety of the features of claim 1. The essence of the invention is in the ripple springs being arranged in the bottom of the sub-slot and, via an axial profile which is arranged in the sub-slot, acting by their spring force upon the conductor elements which lie above them. Since the springs are no longer arranged between the sub-slot and the conductor elements which are to be cooled, they do not need to make an allowance for the inlet openings for the cooling medium and can therefore be produced and inserted with a large axial length. The access to the inlet openings is achieved by means of a corresponding design on the upper side of the profile, while the underside of the profile, against which the springs abut, can be designed in an axially continuous manner.

This particularly also applies when the conductor elements have axial cooling ducts inside which are divided into individual axial duct sections which are separated from each other flow-wise and exposed to throughflow by the supplied cooling medium which at one end enters the duct section in each case and at the other end discharges again from the duct section, and when the conductor elements have in each case separate cooling ducts which lie next to each other and are divided in an alternating manner into overlapping duct sections.

According to one development of the invention, the profile is formed as a closed quadrangular hollow profile.

Another development is characterized in that the profile is divided into two chambers by means of a middle wall which extends in the radial direction, and in that by means of the chambers different cooling ducts of the conductor elements are supplied with cooling medium.

The profile preferably fills out the sub-slot in cross section to a large extent.

According to one development of the invention, the sub-slot has a rectangular cross section. This is particularly the case when,—as in FIG. 3 of EP-A1-0 652 623 which is referred to in the introduction, the stack of conductor elements is supported on an insulating strip which lies above the sub-slot.

Another development is characterized in that the sub-slot has a downwards tapering trapezoidal cross section. As a result of this, concentrations of the mechanical stress in the rotor teeth can be reduced.

It is also possible, to form the profile as a double-T profile, as a result of which material can be saved in the profile.

The profile can consist of an electrically insulating material. It cannot then be part of the winding.

The profile can also consist of a metal and then, depending upon the design of the insulation in the winding slot, can be part of the winding.

The profile can especially consist of aluminium and be extruded. Known and inexpensive production methods are suitable for this.

The profile can also consist of copper or another material with good electrical conductivity.

If an electrically conducting profile should not be part of the winding, the profile is located outside the insulation which encloses the conductor elements in the winding slots.

In other cases, the profile is also enclosed by the insulation.

BRIEF EXPLANATION OF THE FIGURES

The invention shall subsequently be explained in more detail based on exemplary embodiments in conjunction with the drawing. In the drawing

WAYS OF IMPLEMENTING THE INVENTION

Figure 1:
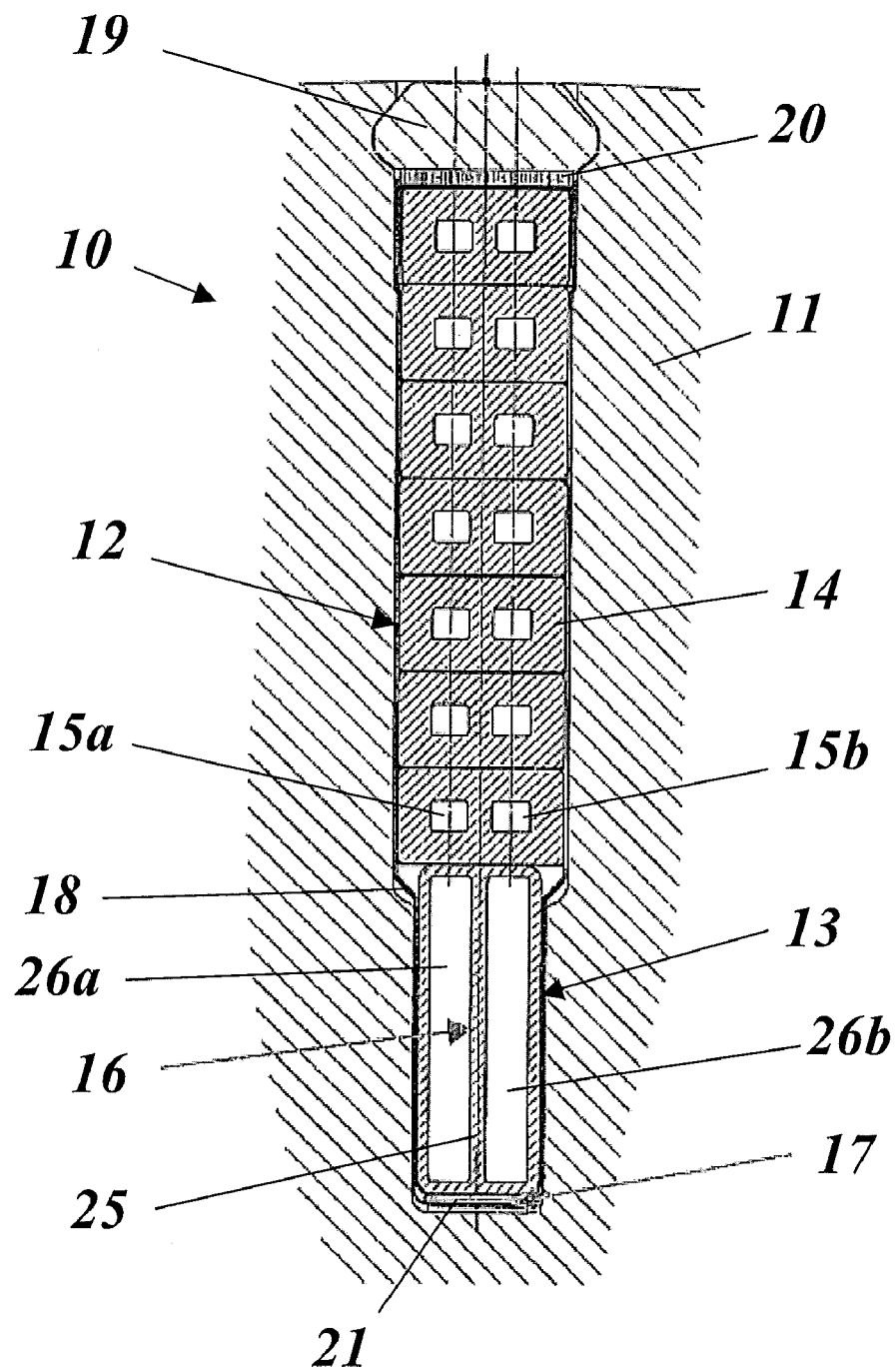
FIG. 1 shows the cross section through a winding slot of a rotor with rectangular sub-slot and rectangular hollow profile according to a preferred exemplary embodiment of the invention.

In FIG. 1, in a detail, the cross section through a winding slot of a rotor with rectangular sub-slot and rectangular hollow profile according to a preferred exemplary embodiment of the invention is reproduced. The rotor 10 customarily has a cylindrical rotor body 11 which is rotatably mounted around a machine axis, which is not shown, and is concentrically enclosed by a stator (also not shown).

Radial winding slots 12, which accommodate the rotor winding which is formed from individual bar-like conductor elements 14 which extend in the axial direction, are let into the rotor body 11 and distributed over the circumference of the rotor 10. The conductor elements 14 are arranged in numbers one above the other in the winding slot 12 and fill out the winding slot 12 to a great extent. They are enclosed by an insulation 18 which electrically insulates the conductor elements 14 or the winding from the rotor body 11. The winding slot 12 is closed off at the top by means of a slot wedge 19. A separator 20 is provided between slot wedge 19 and the upper conductor element 14.

In the exemplary embodiment of FIG. 1, each conductor element 14 has a pair of cooling ducts 15a and 15b inside which extend parallel next to each other in the axial direction and which,—as is described in publication EP-A1-1 455 433 which is referred to in the introduction, are divided into individual axial duct sections which lie one behind the other in the axial direction, are separated from each other flow-wise, and through which flows a cooling medium. The individual duct sections of the two cooling ducts 15a and 15b in this case are arranged in a manner in which they are offset to each other and overlap.

The cooling medium, for example air, is fed from the bottom via a sub-slot 13 which is let into the bottom of the winding slot 12, enters via corresponding inlet openings at the one end of the duct sections, flows through the duct sections and at the other ends of the duct sections is guided upwards and outwards through the slot wedge.

The stack of conductor elements 14 is pressed from the bottom against the slot wedge 19 by means of a spring force. The spring force is created by ripple springs 17 which are arranged beneath the conductor elements 14. In this case, it is novel that the ripple springs 17 no longer act directly or via a separator upon the lowermost conductor element 14 but via a profile 16 which is inserted into the sub-slot 13 and practically completely fills out the sub-slot 13. In the example of FIG. 1, the sub-slot 13, and correspondingly the profile 16, have a rectangular cross section. The profile 16 is constructed as a hollow profile with uniform wall thickness and is divided into two chambers 26a and 26b by means of a middle wall 25. The left-hand chamber 26a is associated with the left-hand cooling ducts 15a for the feed of cooling medium, the right-hand chamber 26b correspondingly being associated with the right-hand cooling ducts 15b. The profile 16 can be an extruded aluminium profile. However, it can also consist of another metal such as Cu, or consist of a mechanically stable, electrically insulating material. If the profile 16 consists of a material with electrically good conductivity it can also be integrated into the rotor winding as a conductor element. This is the case in FIG. 1 where the insulation 18 of the conductor elements 14 also encloses the profile 16 in the sub-slot 13.

The ripple springs 17 are arranged on the bottom of the sub-slot 13 and by their spring force act upon the stack of conductor elements 14 via the interposed profile 16. Since the profile 16 only has to have recesses on the upper side at the points at which the inlet openings for the duct sections are arranged, the underside of the profile 16 can be formed in a continuous manner. The ripple springs 17 can be correspondingly formed in a continuous manner on the underside of the profile so that the axial length of the winding slot 12 or of the sub-slot 13 can be almost entirely utilized for creating the spring force. In FIG. 1, directly beneath the profile 16, provision is made for a separator 21 which is also enclosed by the insulation 18. The ripple spring 17 is positioned beneath it.

With reference to FIG. 1, it can be seen that the cross-sectional area for the flow of cooling medium in the sub-slot 13 is reduced by means of the inserted profile 16 with its wall thickness. The reduction for example can be about 30%. In order to achieve a compensation here, either the sub-slot 13 can be made wider or a downwards tapering, trapezoidal cross section can be provided, as is shown in the examples of FIGS. 2 and 3.

Figure 2:
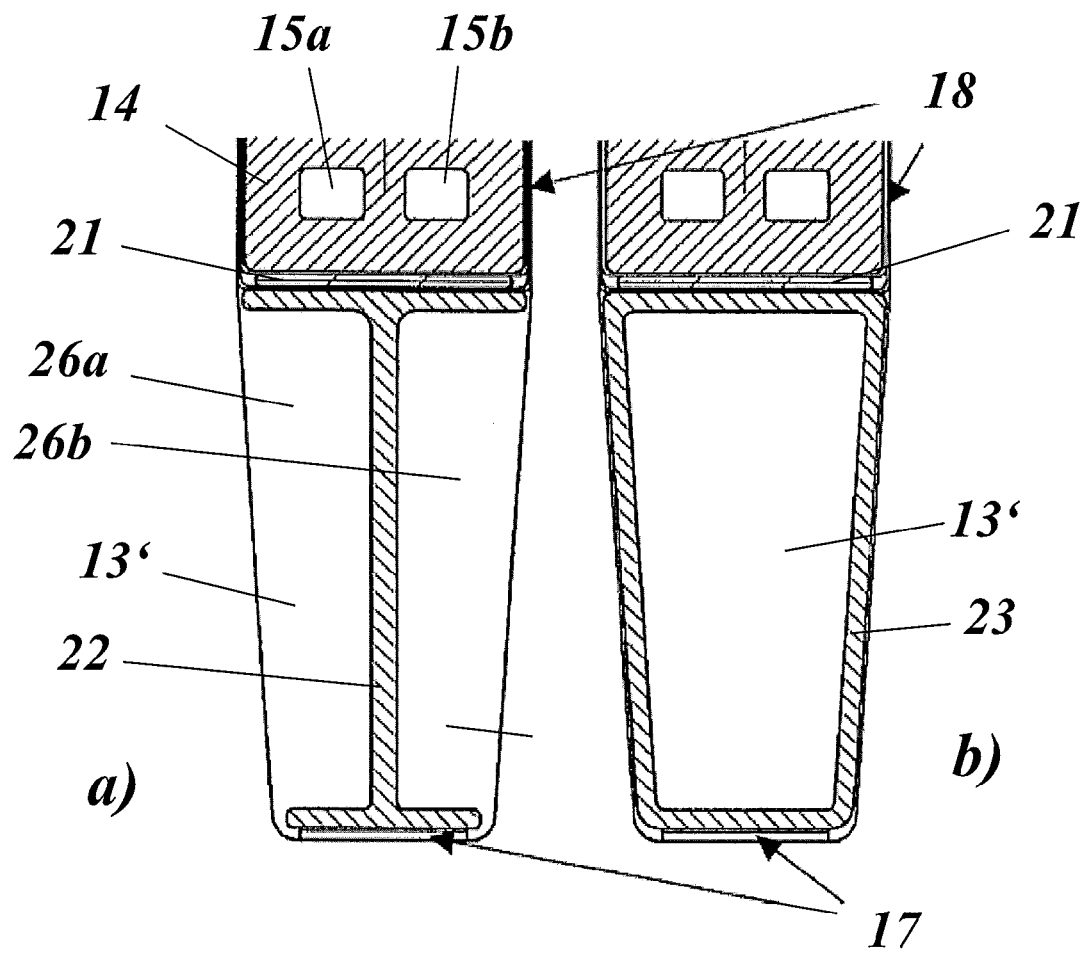
FIG. 2 shows in two sub-figures two further exemplary embodiments of the rotor according to the invention with trapezoidal sub-slot, wherein in the one case (FIG. 2a) a double-T profile is used, and in the other case (FIG. 2b) a quadrangular hollow profile is used.

FIG. 2, in two sub-FIGS. 2a and 2b, reproduces two further exemplary embodiments of the rotor according to the invention, which are equipped with a trapezoidal sub-slot 13', wherein in the one case (FIG. 2a) a double-T profile is used as a profile 22, and in the other case (FIG. 2b) a simple quadrangular profile without a middle wall is used as a profile 23. In both cases, the profile 22 or 23 is not also enclosed by the insulation. In the case of FIG. 2a, the spring force is transmitted exclusively via the middle rib of the profile 22, and in the case of FIG. 2b is transmitted exclusively via the outer walls. In both cases, the reduction of the available flow cross section is less than in the case of the example of FIG. 1 or the examples of FIG. 3, in which an (additional) middle wall 25 is available in each case.

Figure 3:
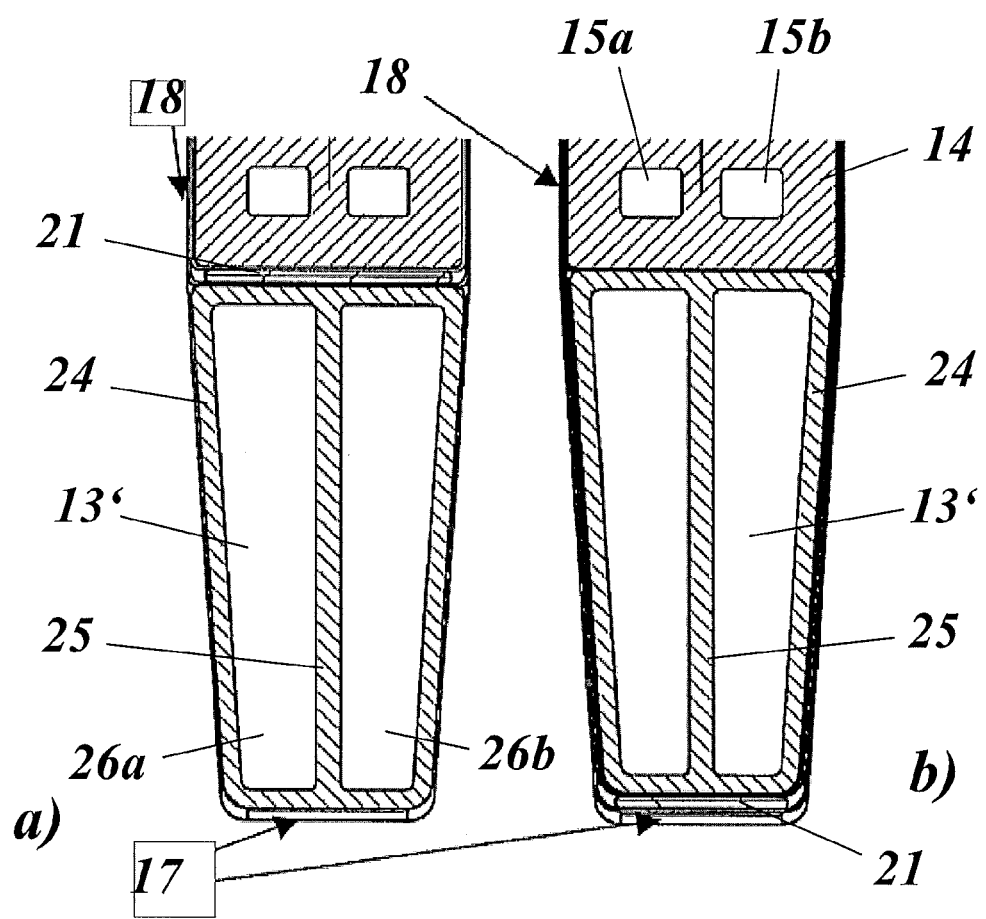
FIG. 3 shows in two sub-figures two further exemplary embodiments of the rotor according to the invention with trapezoidal sub-slot and a quadrangular hollow profile which is divided by means of a middle wall, wherein in the one case (FIG. 3a) the insulation of the conductor elements does not also enclose the profile, whereas in the other case (FIG. 3b) the hollow profile is also enclosed by it.

In the case of the exemplary embodiments which are shown in FIG. 3, similar to FIG. 1, a quadrangular profile 24 with a separating middle wall is inserted into the trapezoidal sub-slot 13' and adapted to this in cross section. In FIG. 3a, as in FIG. 2, the profile 24 is not also enclosed by the insulation 18. In FIG. 3b, on the other hand, the profile 24 is also enclosed by the insulation 18.

The principle function of the profile 16, 22, 23, 24 which is inserted into the sub-slot 13 or 13' is the transmission of the radially orientated spring force from the ripple spring 17 onto the lowermost conductor element 14. In addition, the profile can also be used for the guiding of the cooling medium flow in a prespecified manner.

LIST OF DESIGNATIONS

10 Rotor
11 Rotor body
12 Winding slot
13, 13' Sub-slot
14 Conductor element
15 Cooling duct
16 Profile
17 Ripple spring
18 Insulation
19 Slot wedge
20, 21 Separator
22, 23, 24 Profile
25 Middle wall
26a, b Chamber

The invention claimed is:

1. Rotor for a generator, comprising:
a cylindrical rotor body with axial winding slots which are arranged in a distributed manner over a circumference of the rotor body and in which are arranged conductor elements which extend in an axial direction of the rotor body axis;
a sub-slot arranged at a bottom of a winding slot for receiving a cooling medium fed along the axis in periodic intervals to the conductor elements; and
ripple springs located beneath the conductor elements at a bottom of the sub-slot which press the conductor elements of a winding slot against a slot wedge which closes off a top of the winding slot, wherein the ripple springs, via an axial profile arranged in the sub-slot, act by spring force upon the conductor elements.

2. Rotor according to claim 1, wherein the conductor elements comprise:
axial cooling ducts inside which are divided into individual axial duct sections which are separated from each other flow-wise for exposure to throughflow by the cooling medium which enters each duct section at one end and discharges from each duct section at another end, the conductor elements each having separate cooling ducts which lie next to each other and are divided in an alternating manner into overlapping duct sections.

3. Rotor according to claim 1 wherein the axial profile is formed as a closed quadrangular hollow profile.

4. Rotor according to claim 3, wherein the axial profile is divided into two chambers by means of a middle wall which extends in a radial direction, for supplying a cooling medium to different cooling ducts of the conductor elements.

5. Rotor according to claim 3, wherein the axial profile fills out the sub-slot in cross section to large extent.

6. Rotor according to claim 3, wherein the sub-slot has a rectangular cross section.

7. Rotor according to claim 3, wherein the sub-slot has a downwards tapering, trapezoidal cross section.

8. Rotor according to claim 1 wherein the axial profile is formed as a double-T profile.

9. Rotor according to claim 1, wherein the axial profile consists of an electrically insulating material.

10. Rotor according to claim 1, wherein the axial profile consists of a metal.

11. Rotor according to claim 10, wherein the axial profile is extruded aluminium.

12. Rotor according to claim 10, wherein the axial profile consists of copper.

13. Rotor according to claim 1, wherein the conductor elements in the winding slots are enclosed by insulation, and the axial profile is located outside the insulation.

14. Rotor according to claim 1, wherein the conductor elements in the winding slots are enclosed by an insulation, and the axial profile is also enclosed by the insulation.

15. Rotor according to claim 2, wherein the axial profile is formed as a closed quadrangular hollow profile.

16. Rotor according to claim 4, wherein the axial profile fills out the sub-slot in cross section to large extent.

17. Rotor according to claim 4, wherein the sub-slot has a rectangular cross section.

18. Rotor according to claim 5, wherein the sub-slot has a rectangular cross section.

19. Rotor according to claim 4, wherein the axial profile fills out the sub-slot in cross section to large extent.

20. Rotor according to claim 5, wherein the axial profile fills out the sub-slot in cross section to large extent.

* * * * *